United States Patent
Yanakiev et al.

(10) Patent No.: US 8,956,264 B2
(45) Date of Patent: Feb. 17, 2015

(54) CONTROL SYSTEM AND METHOD FOR A VEHICLE TRANSMISSION

(75) Inventors: Diana Yanakiev, Birmingham, MI (US); Yuji Fujii, Ann Arbor, MI (US); Gregory Michael Pietron, Canton, MI (US); Alexander O'Connor Gibson, Ann Arbor, MI (US); Joseph F. Kucharski, Livonia, MI (US); Nimrod Kapas, Dearborn, MI (US)

(73) Assignee: Ford Global Technologies, Dearborn, MI (US)

( * ) Notice: Subject to any disclaimer, the term of this patent is extended or adjusted under 35 U.S.C. 154(b) by 213 days.

(21) Appl. No.: 13/533,561

(22) Filed: Jun. 26, 2012

(65) Prior Publication Data
US 2013/0345022 A1 Dec. 26, 2013

(51) Int. Cl.
*B60W 10/00* (2006.01)
*B60W 10/02* (2006.01)
*B60W 10/04* (2006.01)

(52) U.S. Cl.
USPC .............................. 477/80; 477/175; 477/180

(58) Field of Classification Search
CPC ..................... B60W 10/00; B60W 2050/0001; B60W 2510/00; B60W 2710/00
USPC .................. 477/70, 71, 79, 80, 174, 175, 180
See application file for complete search history.

(56) References Cited

U.S. PATENT DOCUMENTS

| 6,052,640 | A | 4/2000 | Wu | |
|---|---|---|---|---|
| 6,427,109 | B1 | 7/2002 | Doering et al. | |
| 6,594,573 | B1* | 7/2003 | Rossmann et al. | 701/67 |
| 7,340,336 | B2* | 3/2008 | Yasui et al. | 701/67 |
| 7,478,572 | B2 | 1/2009 | Maten et al. | |
| 7,580,786 | B2* | 8/2009 | Yanakiev | 701/97 |
| 7,603,219 | B2* | 10/2009 | Joshi et al. | 701/68 |
| 7,752,021 | B2 | 7/2010 | Holtz et al. | |
| 2006/0245929 | A1* | 11/2006 | McDonald et al. | 417/32 |
| 2007/0294017 | A1* | 12/2007 | Joshi et al. | 701/67 |
| 2009/0181824 | A1 | 7/2009 | Baeuerle | |
| 2010/0063696 | A1 | 3/2010 | Runde et al. | |
| 2010/0318269 | A1 | 12/2010 | Yanakiev et al. | |

FOREIGN PATENT DOCUMENTS

JP 2013029140 A * 2/2013

* cited by examiner

*Primary Examiner* — Tisha Lewis
(74) *Attorney, Agent, or Firm* — James Dottavio; Brooks Kushman P.C.

(57) ABSTRACT

A control system for a vehicle transmission includes a controller configured to output a first torque estimate defined in terms of one nonlinear function of a transmission parameter for a particular value of the transmission parameter. The controller also receives a measured torque of the transmission at the particular value of the transmission parameter, and outputs a modified torque estimate for the particular value of the transmission parameter based on the measured torque.

19 Claims, 3 Drawing Sheets

US 8,956,264 B2

CONTROL SYSTEM AND METHOD FOR A VEHICLE TRANSMISSION

TECHNICAL FIELD

The present invention relates to a control system and method for a vehicle transmission.

BACKGROUND

Knowledge of various torque values within an automatic transmission is useful for many aspects of powertrain control. For example, knowing the input and output shaft torque of a transmission gear box is particularly useful for controlling the transmission to provide consistent and robust transmission shifts. Using these torque signals along with input and output shaft speeds facilitates accurate estimation of individual clutch torques during a shift. One such control system and method are described in United States patent application publication number US20100318269, filed on 23 Aug. 2010, which is hereby incorporated herein by reference.

For cost or other considerations it is not always possible to directly measure each torque within the transmission, and therefore, control system specialists rely on various transmission models to estimate torque values that are not directly measured. In one such model, a quasi-static nonlinear model of a torque converter within the transmission is used to provide torque estimates. Such models rely on multiple nonlinear functions, and are therefore not readily susceptible to adaptive modeling techniques where the values of the estimates are periodically improved. This is because the estimated value, when it is found to deviate from a verifiable value, may require adjustment of one or more of the nonlinear functions in the model, but it is not possible to know which function or functions requires adjustment. Therefore, a need exists for a system and method for a vehicle transmission that provides accurate and adaptable estimates of transmission torque.

SUMMARY

At least some embodiments of the invention include a method for controlling a vehicle transmission using a torque estimate. At least one transmission component is automatically controlled during a shift event based on a first torque estimate defined in terms of one nonlinear function of a transmission parameter for a particular value of the transmission parameter. The first torque estimate is modified outside of a shift event based on a measured torque of the transmission at the particular value of the transmission parameter.

At least some embodiments of the invention include a method for controlling a vehicle transmission using a torque estimate. At least one transmission component is automatically controlled based on a first torque estimate for a particular value of a transmission parameter. The first torque estimate is based on one nonlinear function of the transmission parameter which combines a plurality of nonlinear functions of the transmission parameter.

At least some embodiments of the invention include a control system for a vehicle transmission. The control system includes a controller configured to: output a first torque estimate defined in terms of one nonlinear function of a transmission parameter for a particular value of the transmission parameter, receive a measured torque of the transmission at the particular value of the transmission parameter, and output a modified torque estimate for the particular value of the transmission parameter based on the measured torque.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
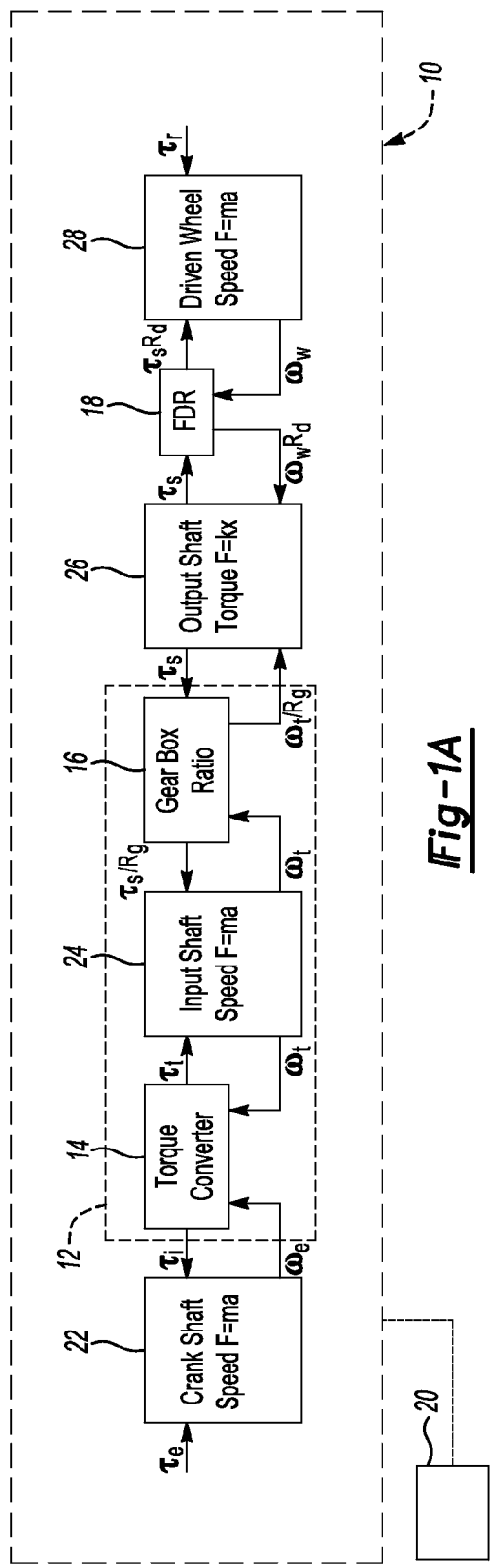
FIG. 1A is a diagram illustrating a torque balance for a vehicle powertrain when the transmission is outside a shift event.

FIG. 1A shows a schematic illustration of a powertrain 10 of a vehicle, it being understood that vehicle powertrains may include fewer or more components than those illustrated in FIG. 1A. Shown in this diagram are a transmission 12, made up of a torque converter 14 and a gearbox 16, and a differential, indicated by FDR 18, which stands for a "final drive ratio". The powertrain 10 and its components, such as the transmission 12, are controlled by a control system indicated generally by controller 20. It is understood that a powertrain control system may include any number of hardware and/or software controllers residing in different parts of the vehicle and communicating with one another, for example, through a controller area network (CAN).

Each of the boxes 22, 24, 26, 28 shown in FIG. 1A represents various dynamic equations that relate powertrain torques and speeds to each other to illustrate the torque balance throughout the powertrain 10. For example, an engine torque ($\tau_e$) is shown as an input to 22 and an engine speed ($\omega_e$) is shown as an output to the torque converter 14. Thus, the torque ($\tau_i$) of an impeller in the torque converter balances the engine torque ($\tau_e$) at 22. Next, a speed of the torque converter turbine ($\omega_t$) is shown as an input to the torque converter 14, and a turbine torque ($\tau_t$) of the torque converter 14 is shown as an output. The turbine torque ($\tau_t$) and the turbine speed ($\omega_t$) respectively represent the input torque and input speed for the gearbox 16.

The torques are again balanced at 24, where the turbine torque ($\tau_t$) from the torque converter 14 is balanced against an equal torque from the gearbox 16 ($\tau_s/R_g$). The torque ($\tau_s/R_g$) is the torque of the gearbox output shaft ($\tau_s$) modified by the gear ratio ($R_g$) of the gearbox 16. The turbine speed ($\omega_t$) is shown as an input to the gearbox 16, and shown as an output is an output shaft speed ($\omega_s/R_g$), which is the turbine speed ($\omega_t$) modified by the gear ratio ($R_g$). Another torque balance occurs at 26 with the output shaft torque ($\tau_s$) being balanced against itself. Unlike the dynamic equations used in 22, 24, 28, which are generally based on the equation F=ma, the equations in 26 are generally based on a spring-force relationship, F=kx. As shown at 26, the speed of the output shaft ($\omega_s/R_g$) is equal to the input speed of the FDR 18 ($\omega_w/R_d$). The input speed of the FDR 18 is the wheel speed ($\omega_w$), which is a speed on the output side of the FDR 18, modified by the ratio of the differential ($R_d$). Finally, the torques are balanced at 28 where a road load torque ($\tau_r$) is balanced against the output torque ($\tau_s R_d$) of the FDR 18, which is the output shaft torque ($\tau_s$) modified by the ratio of the differential ($R_d$).

Figure 1B:
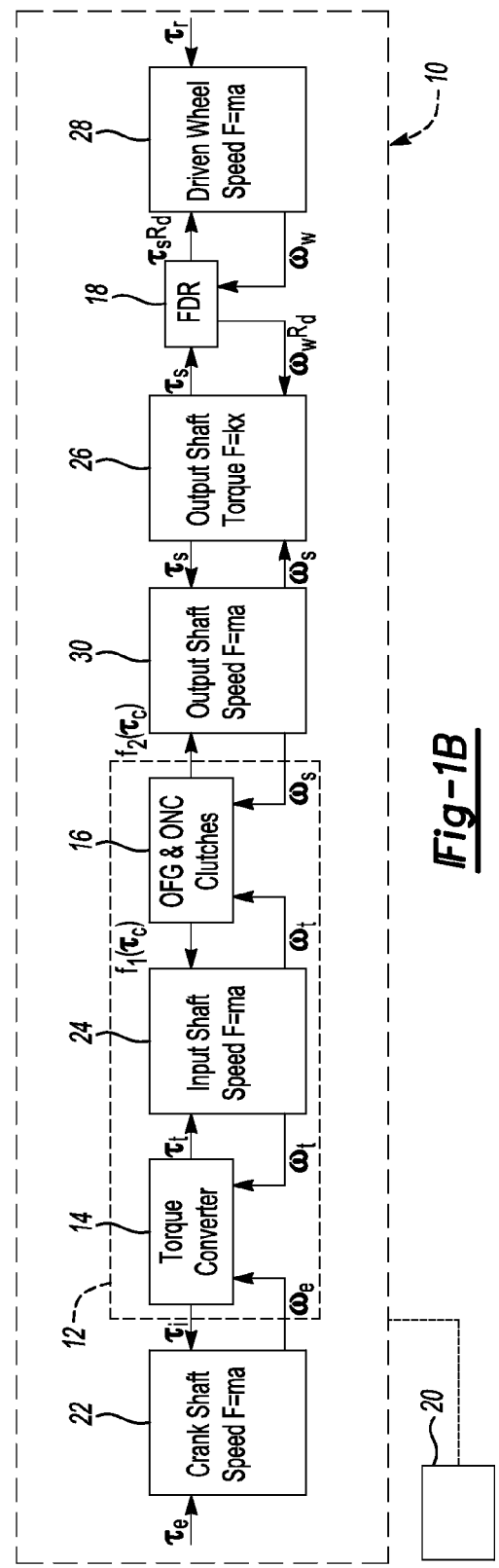
FIG. 1B is a diagram illustrating a torque balance for the vehicle powertrain shown in FIG. 1 during a transmission shift event.

In FIG. 1A, the transmission 12 is outside of a shift event. Therefore, there is a known proportional relationship between the input torque ($\tau_t$) to the gearbox 16 and the output shaft torque ($\tau_s$) of the gearbox 16. During a shift event, however, a transmission, such as the transmission 12, is in a state of change. Specifically, there are certain off-going (OFG) and oncoming (ONC) clutches whose states at any given instant are unknown. This is illustrated in FIG. 1B, where the gearbox 16 indicates the clutches in a state of flux, and instead of known torque values being output from the gearbox 16, there are instead unknown torques ($f_1(\tau_c)$ and $f_2(\tau_c)$), which are functions of the clutch torques, represented generally as ($\tau_c$).

As discussed above, it is often desirable for powertrain control specialists to know various torques within a powertrain, and in particular the input and output torques of the gearbox of the transmission. It was also noted that in many cases, direct measurement of both of these torques is, for various reasons, not possible. If there is a direct measurement of an output torque, for example, the torque ($\tau_s$) of the gearbox 16, then the input torque ($\tau_t$) can be easily calculated if the instant of interest is outside of a shift event for the transmission. This situation is illustrated by FIG. 1A. Conversely, during a shift event, such as illustrated in FIG. 1B, it is not possible to directly relate an output torque, such as the torque ($\tau_s$), to an input torque, such as the torque ($\tau_t$). Therefore, embodiments of the invention provide a system and method for estimating an input torque, which may be particularly useful during a shift event of a transmission. Such a torque estimate can be used, for example, to automatically control at least one transmission component such as a clutch. Having a reliable estimate of the input torque may also be useful outside of the shift event, because the estimate can be compared to a value of the input torque calculated from the output torque and the known gear ratio. This provides diagnostic and fault support—e.g., by providing a check on the health of the output shaft torque sensor.

Embodiments of the invention include a method for estimating a torque, such as an input torque to a gearbox, such as the gearbox 16 of the transmission 12. One way to do this is to provide a first torque estimate that is defined in terms of a single nonlinear function of a transmission parameter, for example, a speed ratio, at a particular value of that transmission parameter. Equation 1 shown below provides such an estimate for a torque, such as the turbine torque ($\tau_t$) described above.

$$T_{T1} = \omega_e^2 TCF(\omega_t/\omega_e) \qquad \text{Eq. 1}$$

In equation 1, the torque ($T_{T1}$) is the input torque to the gearbox 16 (it is also the turbine torque ($\tau_t$) as shown in FIGS. 1A and 1B), and represents the "first torque estimate" as described above. The speed term ($\omega_e$) is the engine speed, as shown in FIGS. 1A and 1B, and the function TCF ($\omega_t/\omega_e$) is the one nonlinear function of a transmission parameter ($\omega_t/\omega_e$) (which in this case a ratio of the speeds across the torque converter 14) that is used to define the first torque estimate ($T_{T1}$). Embodiments of the invention, which utilize a single nonlinear function as part of the definition of a torque estimate, provide advantages over systems and methods that use multiple nonlinear functions in their definitions.

One such equation using multiple nonlinear functions for a torque estimate is illustrated below as equation 2.

$$T_{T2} = \left[\frac{\omega_e}{K(\omega_t/\omega_e)}\right]^2 TR(\omega_t/\omega_e) \qquad \text{Eq. 2}$$

Figure 2:
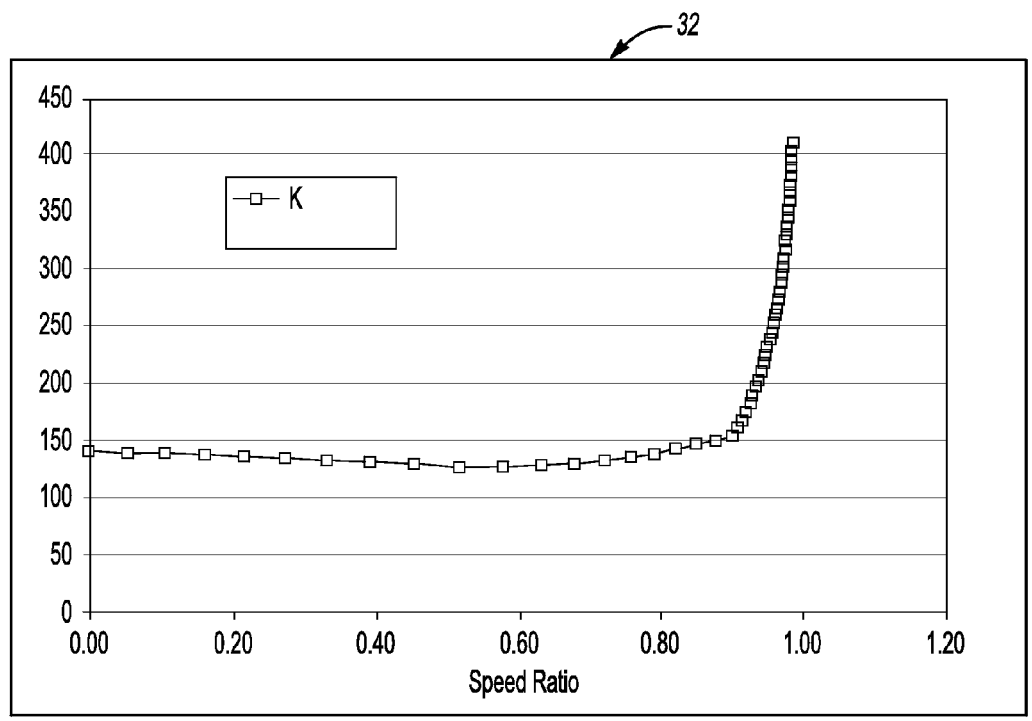
FIG. 2 is a graph showing a nonlinear function of a torque converter speed ratio for a vehicle transmission.

In this equation, the torque estimate ($T_{T2}$) is defined by two separate nonlinear functions of the same transmission parameter ($\omega_t/\omega_e$) as used in equation 1. The first function, $K(\omega_t/\omega_e)$, is illustrated in graph 32 in FIG. 2 for various values of the speed ratio ($\omega_t/\omega_e$). The function $K(\omega_t/\omega_e)$ partially defines an estimate of the impeller torque ($\tau_i$) for the torque converter 14 as shown in the following equation:

$$T_I = \left[\frac{\omega_e}{K(\omega_t/\omega_e)}\right]^2 \qquad \text{Eq. 3}$$

Figure 3:
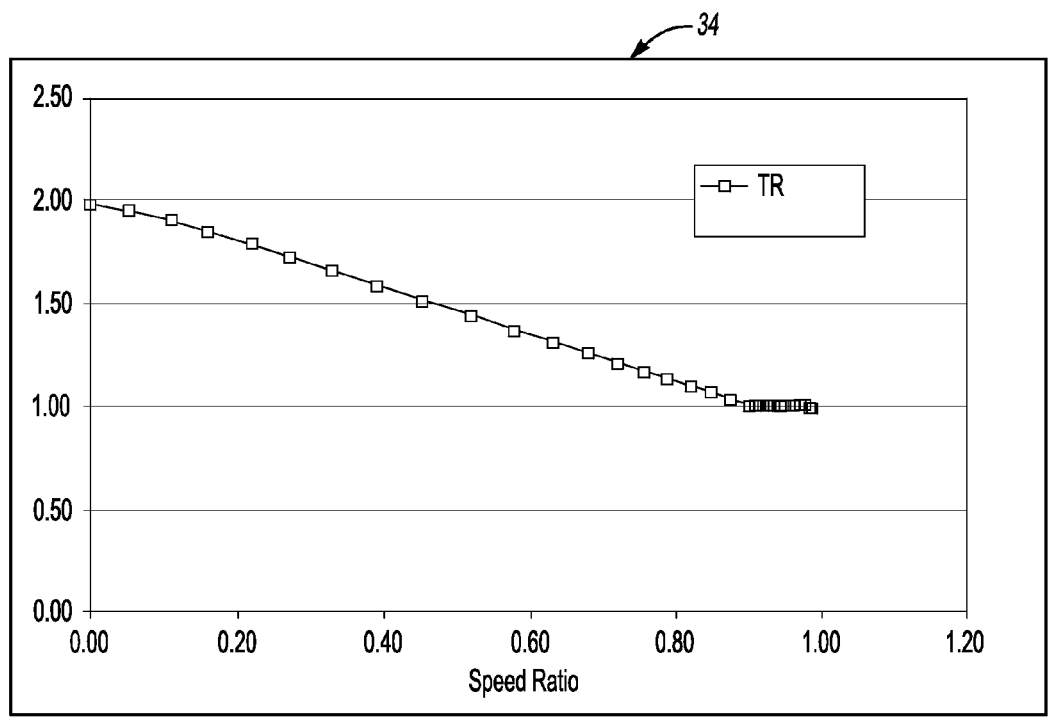
FIG. 3 is a graph showing another nonlinear function of a torque converter speed ratio for a vehicle transmission.

Similarly, the second function used in equation 2, $TR(\omega_t/\omega_e)$, is illustrated in graph 34 in FIG. 3. This function defines a torque ratio across the torque converter 14 and is also a function of the speed ratio ($\omega_t/\omega_e$).

As noted above, using a torque estimate that is defined in terms of a single nonlinear function, such as shown in the equation 1, provides advantages over the torque estimate shown in equation 2. For example, if the torque of the input shaft of the gearbox 16 is estimated according to equation 2, and the estimation takes place outside of a shift event of the transmission 12, the estimated torque ($T_{T2}$) can be compared directly to a measured torque of the gearbox output shaft adjusted by the gear ratio ($\tau_s/R_g$). If it is determined that the estimated torque ($T_{T2}$) is not as accurate as desired, it could be a candidate for an adaptive learning process by which the estimate is adjusted based on a measured value. The problem is that with two nonlinear functions in the definition of the torque ($T_{T2}$), it is not possible to determine which of the two need to be adjusted so as to adapt the torque estimate equation to a more accurate model.

In contrast, using embodiments of the present invention, such as a method using the torque estimate ($T_{T1}$) shown in equation 1, allows the torque estimate to be adapted to measured torque values obtained outside of transmission shift events where there is a known relationship between the measured output shaft torque and the input shaft torque. Thus, in at least some embodiments of the present invention, a first torque estimate, such as the torque ($T_{T1}$), is defined in terms of a single nonlinear function of a transmission parameter— see equation 1 with the single, nonlinear function being TCF ($\omega_t/\omega_e$), and the transmission parameter being the ratio of speeds ($\omega_t/\omega_e$) across the torque converter 14. The first torque estimate may be calculated by the controller 20, and thus "provided" to itself; conversely, it may be calculated elsewhere in a control system and a signal sent to the controller 20, which may use this signal along with other information related to the powertrain 10 to control various elements of the powertrain, such as the transmission 12. The first torque estimate may be used, for example, to automatically control at least one transmission component, such as a clutch or clutches, during a shift event. To provide an actual value, the first torque estimate ($\tau_{T1}$) is provided to the controller 20 at a particular value of the transmission parameter, which in this case is a value of the speed ratio.

Next, the torque of the output shaft ($\tau_s$) is measured at the particular value of the transmission parameter—i.e., at the same value of the speed ratio. As described in detail above, the output shaft torque ($\tau_s$) is easily related to the input shaft torque ($\tau_t$) when the measurement and estimate are taken outside of a shift event. Thus, if the torque estimate ($\tau_{T1}$) is subject to adaptive learning and needs to be adjusted, it is then modified based on the measured torque. Going forward, when the torque is again estimated using equation 1, a modified torque estimate is provided by or to the controller 20 where the value can again be compared to a measured torque if available. Conversely, if the modified torque estimate is provided by or to the controller 20 during a shift event, no comparison is possible, but the modified and presumably more accurate torque estimate is now used by the controller 20 to control the powertrain 10—e.g., to control the torque of the OFG and ONC clutches in the transmission 12.

With regard to the controller 20, a method might be summarized as follows. The controller 20 either calculates or receives from another controller the first torque estimate and "outputs" this value either to itself or as part of a signal to control the powertrain 10. Then, it receives the measured torque, for example, from a torque sensor on the output shaft of the gearbox 16. The controller 20 then determines a "measured" torque for the input shaft of the gearbox 16 based on the measured output shaft torque and the gear ratio of the gearbox 16. If, after comparing the estimated torque to the measured torque, the controller 20 determines that an adaptive learning process should be applied, it modifies the torque estimate, for example, by modifying the function $TCF(\omega_t/\omega_e)$ to account for the difference between the first torque estimate and the measured torque. Finally, the controller 20 "outputs" a modified torque estimate for the particular speed ratio when the torque estimate for that speed ratio is required. As discussed above, this adaptive learning is only relevant outside of transmission shift events, because the measured torque of the output shaft of the gearbox 16 cannot be related to the torque of the input shaft when a shift event is occurring—see FIG. 1B. Thus, the controller is configured to modify the first torque estimate only using data from outside a shift event of the transmission 12.

In order to define a torque estimate, such as the torque estimate ($T_{T1}$) shown in the equation 1, in terms of only one nonlinear function, embodiments of the invention use certain other nonlinear functions from a different torque estimate and combine them to define the single nonlinear function, such as the function $TCF(\omega_t/\omega_e)$ described above. For example, the two nonlinear functions described above from equation 2, can be combined to create a function $TCF(\omega_t/\omega_e)$. When the speed term ($\omega_t^2$) is removed from equation 1, what remains is a combination of the two nonlinear functions that can be combined to create the single nonlinear function $TCF(\omega_t/\omega_e)$. Embodiments of the invention may combine two nonlinear functions such as these to create a single nonlinear function, as shown below in equation 4.

$$TCF(\omega_t/\omega_e) = \left[\frac{1}{K(\omega_t/\omega_e)}\right]^2 TR(\omega_t/\omega_e) \quad \text{Eq. 4}$$

In summary, a preliminary torque estimate ($T_{T2}$) from equation 2 is defined in terms of a plurality of certain nonlinear functions of a transmission parameter: $K(\omega_t/\omega_e)$ and $TR(\omega_t/\omega_e)$. The two nonlinear functions are combined into one nonlinear function, $TCF(\omega_t/\omega_e)$, and this function is used to define a first torque estimate shown in equation 1 above, the value for which can be provided by or to the controller 20 for use in controlling the powertrain 10.

In order to use the one nonlinear function $TCF(\omega_t/\omega_e)$ in the torque estimate ($T_{T1}$) shown in equation 1, it may first be desirable to generate a plurality of values for the function at certain chosen values of the speed ratio ($\omega_t/\omega_e$). Generating these values will allow them to be input into a controller, such as the controller 20 where they could be used as part of a lookup table, or for graphical interpretation they may be plotted in a plot similar to the graphs 32, 34 shown respectively in FIGS. 2 and 3. One way to do this is to choose a number of values for the speed ratio ($\omega_t/\omega_e$) and determine the corresponding values of the functions $K(\omega_t/\omega_e)$ and $TR(\omega_t/\omega_e)$. This can be accomplished since, as discussed above, the values of these functions at various speed ratios are known—see FIGS. 2 and 3. Once the various values of the function $TCF(\omega_t/\omega_e)$ are known for chosen values of the speed ratio ($\omega_t/\omega_e$)—for example, by using equation 4—the torque estimate ($T_{T1}$) can be calculated according to equation 1. If the predetermined value of the speed ratio ($\omega_t/\omega_e$) corresponds to one of the chosen values for the speed ratio ($\omega_t/\omega_e$) the value of the function $TCF(\omega_t/\omega_e)$ will have already been calculated and can be used directly in equation 1. If, however, the predetermined value of the speed ratio ($\omega_t/\omega_e$) is different from one of the chosen values, any interpolation method capable of achieving a desired accuracy can be used to find the value of the function, which is then used in equation 1 to provide the first torque estimate.

Another way to generate values of the function $TCF(\omega_t/\omega_e)$ so that it can be used to estimate torque as described above is to use equation 1 along with torque values measured outside of transmission shift events for known values of the speed ratio ($\omega_t/\omega_e$) and engine speed ($\omega_e$). In this case, the measured torque values are substituted into ($T_{T1}$), which is now a known rather than an unknown, and with the speed ratio ($\omega_t/\omega_e$) and engine speed ($\omega_e$) values known, the only unknown is the value of the function $TCF(\omega_t/\omega_e)$ itself, and thus it can be easily solved for by manipulating equation 1. Once the values of the function $TCF(\omega_t/\omega_e)$ are known over a range of the speed ratio ($\omega_t/\omega_e$) and engine speed ($\omega_e$), equation 1 can be used to provide the torque estimate ($T_{T1}$) for the predetermined value of the speed ratio ($\omega_t/\omega_e$). As above, if the predetermined value of the speed ratio ($\omega_t/\omega_e$) corresponds to one of the values for the speed ratio ($\omega_t/\omega_e$) used to calculate the value of the function $TCF(\omega_t/\omega_e)$, this value of the function $TCF(\omega_t/\omega_e)$ can be used directly in equation 1. If, however, the predetermined value of the speed ratio ($\omega_t/\omega_e$) is different from one of the values previously used, interpolation can be used to find the value of the function $TCF(\omega_t/\omega_e)$, which is then used in equation 1 to provide the first torque estimate.

Figure 4:
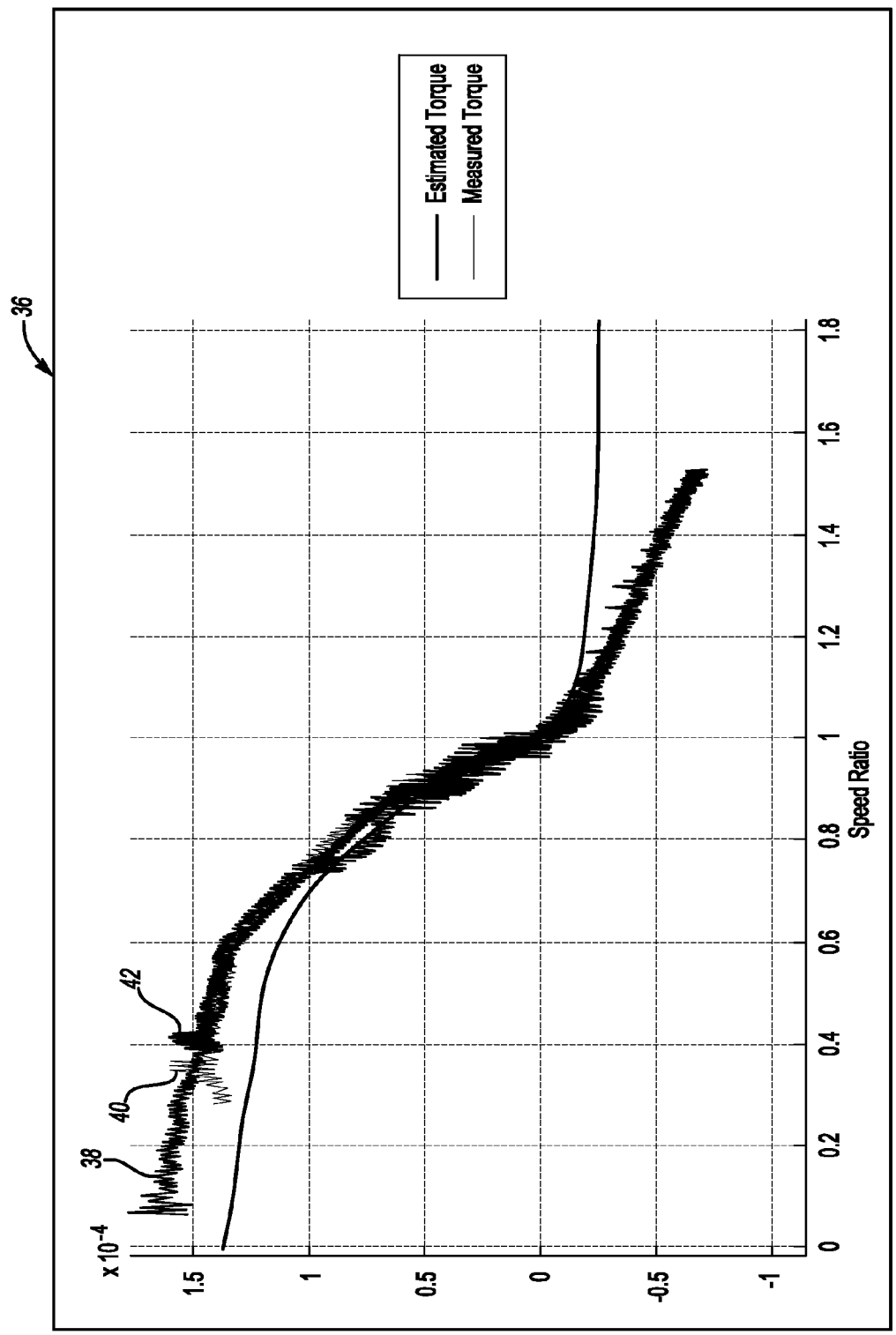
FIG. 4 is a graph showing an estimated torque compared to a measured torque for a vehicle transmission.

As described in detail above, this torque estimate can be compared to measured torque values and an adaptive learning process can be implemented to further refine the function $TCF(\omega_t/\omega_e)$ as needed. Shown in FIG. 4 is a graph 36 illustrating a difference between a torque estimated using the functions $K(\omega_t/\omega_e)$ and $TR(\omega_t/\omega_e)$ as described in the first example above, which is shown in the thick solid line, and measured torque values based on an output shaft torque sensor measurement, shown in the thinner, more erratic lines. The measured torque values are actually three separate traces 38, 40, 42, which represent separate measurements over the given range of speed ratios. As can be seen in FIG. 4, the traces 38, 40, 42 overlap for much of the speed ratio range, and are not individually distinguishable. The graphic 36 clearly illustrates the close relationship between the estimated and the measured torque, and also illustrates areas where adaptive techniques could be used to improve the estimated torque.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a vehicle transmission using a torque estimate, comprising:
   automatically controlling at least one transmission component during a shift event based on a first torque estimate defined in terms of one nonlinear function of a transmission parameter for a particular value of the transmission parameter; and
   modifying the first torque estimate outside of a shift event based on a measured torque of the transmission at the particular value of the transmission parameter.

2. The method of claim 1, wherein the one nonlinear function of the transmission parameter is defined using a plurality of other nonlinear functions of the transmission parameter.

3. The method of claim 2, wherein the other nonlinear functions of the transmission parameter include a function partially defining an estimate of an impeller torque for a torque converter for the transmission and a function defining a torque ratio across the torque converter.

4. The method of claim 3, wherein the first torque estimate is an estimate of a turbine torque for the torque converter.

5. The method of claim 3, wherein the transmission parameter is a ratio of a speed of a turbine to a speed of the impeller.

6. The method of claim 2, further comprising inputting into the other nonlinear functions of the transmission parameter a plurality of chosen values of the transmission parameter, thereby generating a plurality of values of the one nonlinear function of the transmission parameter at the chosen values of the transmission parameter.

7. The method of claim 6, wherein the step of providing a first torque estimate for a particular value of a transmission parameter includes using one of the chosen values of the transmission parameter for the particular value of the transmission parameter.

8. The method of claim 2, further comprising:
   measuring a torque of the transmission at a plurality of chosen values of the transmission parameter;
   defining the one nonlinear function of the transmission parameter in terms of a torque estimate; and
   using the measured torque at the chosen values of the transmission parameter as the torque estimate, thereby generating a plurality of values of the one nonlinear function of the transmission parameter at the chosen values of the transmission parameter.

9. A method for controlling a vehicle transmission using a torque estimate, comprising:
   automatically controlling at least one transmission component based on a first torque estimate for a particular value of a transmission parameter, the first torque estimate based on one nonlinear function of the transmission parameter which combines a plurality of nonlinear functions of the transmission parameter; and
   measuring a torque of the transmission at the particular value of the transmission parameter and modifying the first torque estimate based on the measured torque.

10. The method of claim 9, wherein measuring a torque of the transmission at the particular value of the transmission parameter and modifying the first torque estimate based on the measured torque occur outside a shift event of the transmission.

11. The method of claim 9, wherein the first torque estimate is an estimate of a turbine torque for a torque converter of the transmission, and the transmission parameter is a ratio of a speed of the turbine to a speed of an impeller for the torque converter.

12. The method of claim 9, wherein the nonlinear functions of the transmission parameter include a function partially defining an estimate of an impeller torque for a torque converter for the transmission and a function defining a torque ratio across the torque converter.

13. The method of claim 9, further comprising inputting into the nonlinear functions of the transmission parameter a plurality of chosen values of the transmission parameter to generate a plurality of values of the one nonlinear function of the transmission parameter at the chosen values of the transmission parameter.

14. The method of claim 13, wherein providing the first torque estimate for a particular value of the transmission parameter includes using the generated values of the one nonlinear function to determine the value of the first torque estimate at the particular value of the transmission parameter.

15. A control system for a vehicle transmission, comprising:
   a controller configured to:
   output a first torque estimate defined in terms of one nonlinear function of a transmission parameter for a particular value of the transmission parameter;
   receive a measured torque of the transmission at the particular value of the transmission parameter; and
   output a modified torque estimate for the particular value of the transmission parameter based on the measured torque.

16. The system of claim 15, wherein the one nonlinear function of the transmission parameter is defined using a plurality of other nonlinear functions of the transmission parameter.

17. The system of claim 16, wherein the other nonlinear functions of the transmission parameter include a function partially defining an estimate of an impeller torque for a torque converter for the transmission and a function defining a torque ratio across the torque converter.

18. The system of claim 17, wherein the first torque estimate is an estimate of a turbine torque for the torque converter, and the transmission parameter is a ratio of a speed of the turbine to a speed of the impeller.

19. The system of claim 16, wherein the controller is further configured to modify the first torque estimate only using data from outside a shift event of the transmission.

* * * * *